(12) United States Patent
Guirguis et al.

(10) Patent No.: US 8,918,410 B2
(45) Date of Patent: Dec. 23, 2014

(54) SYSTEM AND METHOD FOR FAST IDENTIFICATION OF VARIABLE ROLES DURING INITIAL DATA EXPLORATION

(71) Applicant: SAS Institute Inc., Cary, NC (US)

(72) Inventors: Georges H. Guirguis, Cary, NC (US); Scott Pope, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 110 days.

(21) Appl. No.: 13/772,404

(22) Filed: Feb. 21, 2013

(65) Prior Publication Data

US 2014/0237001 A1   Aug. 21, 2014

(51) Int. Cl.
*G06F 7/00* (2006.01)
*G06Q 10/06* (2012.01)

(52) U.S. Cl.
CPC ................................. *G06Q 10/06* (2013.01)
USPC ........................................................ 707/758

(58) Field of Classification Search
CPC .............. G06F 17/30386; G06F 17/30424; G06F 17/30241; G06F 17/30864; G06F 17/30867; G06F 17/30011; G06F 17/30292; G06F 17/30495; G06F 17/30705; G06F 17/30; G06F 17/30023; G06F 17/301; G06F 17/30247
USPC ........................................................... 707/758
See application file for complete search history.

(56) References Cited

PUBLICATIONS

Williams, Graham, "Rattle: A Data Mining GUI for R", The R Jounal vol. 1/2, Dec. 2009, ISSN 2073-4859, pp. 45-55.
The Basics of SAS Enterprise Miner 5.2, undated, 46 pages.

*Primary Examiner* — Truong Vo
(74) *Attorney, Agent, or Firm* — Bell & Manning, LLC

(57) ABSTRACT

Systems and methods are provided for identifying data variable rules during initial data exploration. In one example, a computer-implemented method of determining a role for a data variable is disclosed. The method comprises identifying to a plurality of data nodes a set of data records containing data values assigned to each data node, a maximum number of levels to record in a sorted data structure at the data nodes, and the data node responsible for each of a plurality of variables. The method further comprises receiving for each variable from the data node responsible for the variable a plurality of unique data values for the variable, a count for each of the unique data values and an overflow count for the variable, wherein the number of unique data values does not exceed the maximum number of levels. A role for a variable can be determined based upon the unique data values, counts and overflow count for the variable.

94 Claims, 17 Drawing Sheets

TABLE 1 WORKER1 DATA

| C1 | N1 |
|---|---|
| 1 | 21.2 |
| 2 | 65.3 |
| 1 | 17.3 |
| 3 | 51 |
| 1 | 29.9 |
| 2 | 38.6 |

TABLE 2 WORKER2 DATA

| C1 | N1 |
|---|---|
| 1 | 9.8 |
| 1 | 30.3 |
| 2 | 72.1 |
| 3 | 60.5 |
| 1 | 35.2 |
| 2 | 2.1 |

Fig. 13

WORKER1 OBSERVATIONS

1

| C1 | VAL: 1 | N1 | VAL: 21.2 |
|---|---|---|---|
| LEVEL | FREQ | LEVEL | FREQ |
| 1 | 1 | 21.2 | 1 |
|  |  |  |  |
|  |  |  |  |
| OTHER | 0 | OTHER | 0 |

2

| C1 | VAL: 2 | N1 | VAL: 65.3 |
|---|---|---|---|
| LEVEL | FREQ | LEVEL | FREQ |
| 1 | 1 | 21.2 | 1 |
| 2 | 1 | 65.3 | 1 |
|  |  |  |  |
| OTHER | 0 | OTHER | 0 |

3

| C1 | VAL: 1 | N1 | VAL: 17.3 |
|---|---|---|---|
| LEVEL | FREQ | LEVEL | FREQ |
| 1 | 2 | 17.3 | 1 |
| 2 | 1 | 21.2 | 1 |
|  |  | 65.3 | 1 |
| OTHER | 0 | OTHER | 0 |

WORKER2 OBSERVATIONS

| C1 | VAL: 1 | N1 | VAL: 9.8 |
|---|---|---|---|
| LEVEL | FREQ | LEVEL | FREQ |
| 1 | 1 | 9.8 | 1 |
|  |  |  |  |
|  |  |  |  |
| OTHER | 0 | OTHER | 0 |

| C1 | VAL: 1 | N1 | VAL: 30.3 |
|---|---|---|---|
| LEVEL | FREQ | LEVEL | FREQ |
| 1 | 2 | 9.8 | 1 |
|  |  | 30.3 | 1 |
|  |  |  |  |
| OTHER | 0 | OTHER | 0 |

| C1 | VAL: 2 | N1 | VAL: 72.1 |
|---|---|---|---|
| LEVEL | FREQ | LEVEL | FREQ |
| 1 | 2 | 9.8 | 1 |
| 2 | 1 | 30.3 | 1 |
|  |  | 72.1 | 1 |
| OTHER | 0 | OTHER | 0 |

*Fig. 14A*

Row 4:

| C1 | VAL: 3 | N1 | VAL: 51 |
|---|---|---|---|
| LEVEL | FREQ | VALUE | FREQ |
| 1 | 2 | 17.3 | 1 |
| 2 | 1 | 21.2 | 1 |
| 3 | 1 | 51 | 1 |
|  |  | 65.3 | 1 |
| OTHER | 0 | OTHER | 0 |

| C1 | VAL: 3 | N1 | VAL: 60.5 |
|---|---|---|---|
| LEVEL | FREQ | LEVEL | FREQ |
| 1 | 2 | 9.8 | 1 |
| 2 | 1 | 30.3 | 1 |
| 3 | 1 | 60.5 | 1 |
|  |  | 72.1 | 1 |
| OTHER | 0 | OTHER | 0 |

Row 5:

| C1 | VAL: 1 | N1 | VAL: 29.9 |
|---|---|---|---|
| LEVEL | FREQ | VALUE | FREQ |
| 1 | 3 | 17.3 | 1 |
| 2 | 1 | 21.2 | 1 |
| 3 | 1 | 29.9 | 1 |
|  |  | 51 | 1 |
| OTHER | 0 | OTHER | 1 |

| C1 | VAL: 1 | N1 | VAL: 35.2 |
|---|---|---|---|
| LEVEL | FREQ | LEVEL | FREQ |
| 1 | 3 | 9.8 | 1 |
| 2 | 1 | 30.3 | 1 |
| 3 | 1 | 35.2 | 1 |
|  |  | 60.5 | 1 |
| OTHER | 0 | OTHER | 1 |

Row 5P:

| C1 | VAL: 1 | N1 | VAL: 29.9 |
|---|---|---|---|
| LEVEL | FREQ | VALUE | FREQ |
| 1 | 3 | 17.3 | 1 |
| 2 | 1 | 21.2 | 1 |
| 3 | 1 | 29.9 | 1 |
|  |  | 51 | 1 |
| OTHER | 0 | OTHER | 1 |

| C1 | VAL: 1 | N1 | VAL: 35.2 |
|---|---|---|---|
| LEVEL | FREQ | LEVEL | FREQ |
| 1 | 3 | 9.8 | 1 |
| 2 | 1 | 30.3 | 1 |
| 3 | 1 | 35.2 | 1 |
|  |  |  |  |
| OTHER | 0 | OTHER | 2 |

Row 6:

| C1 | VAL: 2 | N1 | VAL: 38.6 |
|---|---|---|---|
| LEVEL | FREQ | VALUE | FREQ |
| 1 | 3 | 17.3 | 1 |
| 2 | 2 | 21.2 | 1 |
| 3 | 1 | 29.9 | 1 |
|  |  | 38.6 | 1 |
| OTHER | 0 | OTHER | 2 |

| C1 | VAL: 2 | N1 | VAL: 2.1 |
|---|---|---|---|
| LEVEL | FREQ | LEVEL | FREQ |
| 1 | 3 | 2.1 | 1 |
| 2 | 2 | 9.8 | 1 |
| 3 | 1 | 30.3 | 1 |
|  |  | 35.2 | 1 |
| OTHER | 0 | OTHER | 2 |

*Fig. 14B*

WORKER1 LEVELS

| C1 | | N1 | |
|---|---|---|---|
| LEVEL | FREQ | LEVEL | FREQ |
| 1 | 3 | 17.3 | 1 |
| 2 | 2 | 21.2 | 1 |
| 3 | 1 | 29.9 | 1 |
| | | | |
| OTHER | 0 | OTHER | 3 |

WORKER2 LEVELS

| C1 | | N1 | |
|---|---|---|---|
| LEVEL | FREQ | LEVEL | FREQ |
| 1 | 3 | 2.1 | 1 |
| 2 | 2 | 9.8 | 1 |
| 3 | 1 | 30.3 | 1 |
| | | 35.2 | 1 |
| OTHER | 0 | OTHER | 2 |

| WORKER1 LEVELS | |
|---|---|
| DATA VALUE | FREQUENCY |
| 1 | 3 |
| 2 | 2 |
| 3 | 1 |
| | |
| OTHER | 0 |

C1

| WORKER2 LEVELS | |
|---|---|
| DATA VALUE | FREQUENCY |
| 1 | 3 |
| 2 | 2 |
| 3 | 1 |
| | |
| OTHER | 0 |

C1

| COMBINED LEVELS | |
|---|---|
| DATA VALUE | FREQUENCY |
| 1 | 6 |
| 2 | 4 |
| 3 | 2 |
| | |
| OTHER | 0 |

| N1 WORKER1 | |
|---|---|
| LEVEL | FREQUENCY |
| 17.3 | 1 |
| 21.2 | 1 |
| 29.9 | 1 |
| | |
| OTHER | 3 |

| N1 WORKER2 | |
|---|---|
| LEVEL | FREQUENCY |
| 2.1 | 1 |
| 9.8 | 1 |
| 30.3 | 1 |
| 35.2 | 1 |
| OTHER | 2 |

Fig. 17B

| N1 WORKER1 LEVELS | |
|---|---|
| DATA VALUE | FREQUENCY |
| | |
| 21.2 | 1 |
| 29.9 | 1 |
| | |
| OTHER | 3 |

| N1 MERGED LEVELS | VAL: 21.2 FREQ:1 |
|---|---|
| LEVEL | FREQUENCY |
| 2.1 | 1 |
| 9.8 | 1 |
| 17.3 | 1 |
| 30.3 | 1 |
| OTHER | 3 |

Fig. 17C

| N1 WORKER1 LEVELS | |
|---|---|
| DATA VALUE | FREQUENCY |
| | |
| | |
| 29.9 | 1 |
| | |
| OTHER | 3 |

| N1 MERGED LEVELS | VAL: 21.2 FREQ:1 |
|---|---|
| LEVEL | FREQUENCY |
| 2.1 | 1 |
| 9.8 | 1 |
| 17.3 | 1 |
| 21.2 | 1 |
| OTHER | 4 |

N1

| WORKER1 | |
|---|---|
| LEVEL | FREQUENCY |
|  |  |
|  |  |
|  |  |
|  |  |
| OTHER | 3 |

→

N1

| MERGED LEVELS | VAL: 29.9 FREQ:1 |
|---|---|
| LEVEL | FREQUENCY |
| 2.1 | 1 |
| 9.8 | 1 |
| 17.3 | 1 |
| 21.2 | 1 |
| OTHER | 5 |

| WORKER1 | |
|---|---|
| LEVEL | FREQUENCY |
|  |  |
|  |  |
|  |  |
|  |  |
| OTHER |  |

N1

| MERGED LEVELS | VAL: OTHER FREQ:3 |
|---|---|
| LEVEL | FREQUENCY |
| 2.1 | 1 |
| 9.8 | 1 |
| 17.3 | 1 |
| 21.2 | 1 |
| OTHER | 8 |

*Fig. 17E*

SYSTEM AND METHOD FOR FAST IDENTIFICATION OF VARIABLE ROLES DURING INITIAL DATA EXPLORATION

TECHNICAL FIELD

The technology described herein relates generally to computer-implemented systems and methods for data mining, and in particular, to computer implemented systems and methods for initial data exploration before the start of data analysis.

BACKGROUND

Data mining can be used in various fields. Data mining may reveal information and insight into a data set.

SUMMARY

In accordance with the teachings provided herein, systems and methods are provided for identifying data variable roles during initial data exploration. In one example, a computer-implemented method of determining a role for a data variable for use in data modeling of a physical process is disclosed. The method comprises identifying to a plurality of data nodes a set of data records containing data values assigned to each data node, a maximum number of levels to record in a sorted data structure at the data nodes, and the data node responsible for each of a plurality of variables. The method further comprises receiving for each variable from the data node responsible for the variable a plurality of unique data values for the variable, a count for each of the unique data values and an overflow count for the variable, wherein the number of unique data values does not exceed the maximum number of levels. The data values, counts and overflow count having been generated at a plurality of data nodes by node data processors configured by data processing instructions to determine whether a next data value for a data record can be added to the sorted data structure at the data node and that a count associated with that next data value can be added to the sorted data structure when the next data value can be added, determine whether the next data value is already included in the sorted data structure and that the count associated with that next data value can be incremented when the next data value is already included, and determine whether the next data value should not be added to the data structure and that an overflow count at that node should be incremented when the next data value cannot be added. A role for a variable can be determined based upon the unique data values, counts and overflow count for the variable.

In another example, a computer-implemented system for determining a role for a data variable for use in data modeling of a physical process is provided. The system comprises a plurality of data nodes each comprising a node data processor configured to perform operations on a plurality of data records. Each data record includes a data value for a variable. The plurality of data nodes include non-transitory computer-readable media encoded with a sorted data structure and encoded with data processing instructions. The sorted data structure is provided for storing up to a predetermined number of unique data values for one or more variables, a count for each of the unique data values, and an overflow count for each of the one or more variables. The data processing instructions comprise instructions for configuring the data node to determine whether a next data value can be added to the sorted data structure at the data node and that a count associated with that next data value can be added to the sorted data structure when the next data value can be added, determine whether the next data value is already included in the sorted data structure and that the count associated with that next data value can be incremented when the next data value is already included, and determine whether the next data value should not be added to the data structure and that an overflow count at that node should be incremented when the next data value cannot be added. One of the data nodes is a root data node comprising a root data processor configured by instructions to communicate data record assignments to the data nodes and a maximum number of levels to record in the sorted data structure. The root data processor is also configured to receive for a plurality of variables a plurality of unique data values, a count for each of the unique data values and an overflow count for the variables. A role for a variable can be determined based upon the unique data values, counts and overflow count for the variable.

In yet another example, a computer-program product for performing data mining operations on data is provided. The computer-program product is tangibly embodied in a machine-readable non-transitory storage medium and includes instructions configured to cause a data processing apparatus to identify to a plurality of node data processors a set of data records containing data values, wherein a particular node data processor is assigned a particular set of data records. At the particular node data processor, the instructions are configured to cause a data processing apparatus to determine whether a data value for a next data record in the particular set of data records can be added to a sorted data structure at the particular node data processor, wherein the particular node data processor is configured for each variable to store up to a predetermined number of unique data values in the sorted data structure and a count for each of the unique data values, and wherein the particular node data processor is configured to store an overflow count of data values that cannot be added to the sorted data structure. The instructions are further configured to cause a data processing apparatus to increment the count associated with that data value when the data value can be added and the data value matches a data value in the sorted data structure, add the data value to the sorted data structure when the data value can be added and the data value does not match a data value in the sorted data structure, and increment the overflow count when the data value cannot be added. The instructions are further configured to cause a data processing apparatus to consolidate the data values and counts for each variable from the particular node data processor with data values and counts from other of the plurality of node data processors into a sorted consolidated data structure. A role for a variable can be determined based upon the unique data values, counts and overflow count for a variable.

In another example, a computer-implemented method of determining a role for a data variable for use in data modeling of a physical process is provided. The method comprises receiving the identity of a set of data records containing data values and a maximum number of levels to record in a sorted data structure, determining for a data variable whether a next data value for a data record can be added to the sorted data structure and that a count associated with that next data value can be added to the sorted data structure when the next data value can be added, determining for the data variable whether the next data value is already included in the sorted data structure and that the count associated with that next data value can be incremented when the next data value is already included, and determining for the data variable whether the next data value should not be added to the data structure and that an overflow count should be incremented when the next data value cannot be added. The method further comprises broadcasting for the data variable a plurality of unique data values, a count for each of the unique data values and an overflow count, wherein the number of unique data values does not exceed the maximum number of levels. A role for the variable can be determined based upon the unique data values, counts and overflow count.

BRIEF DESCRIPTION OF THE DRAWINGS

FIG. 13 contains two example tables that, respectively, show the observations that are assigned to example compute node 1 and example compute node 2 for a data table with two variables, C1 and N1.

FIGS. 14a and 14b contain a collection of example tables that show the state of observed levels recorded in the binary trees after each observation is processed.

FIG. 15 contains two example tables that, respectively, show the final level lists for the two example worker nodes after all of the example observations have been processed.

FIG. 16 contains a collection of tables that illustrate the merging of the values for variable C1.

FIGS. 17A-17E contains a collection of tables that illustrate the merging of the values for variable N1. In particular, FIG. 17A illustrates the merger of level 17.3 from Worker 1 with the Worker 2 table. FIG. 17B illustrates the merger of level 21.2 from Worker 1 with the Worker 2 table. FIG. 17C illustrates the merger of level 29.2 from Worker 1 with the Worker 2 table. FIG. 17D illustrates the merger of the Other data from Worker 1 with the Other data in the Worker 2 table. And, the final tables in FIG. 17E illustrate the final result after the data merge is complete.

DETAILED DESCRIPTION

Figure 1:
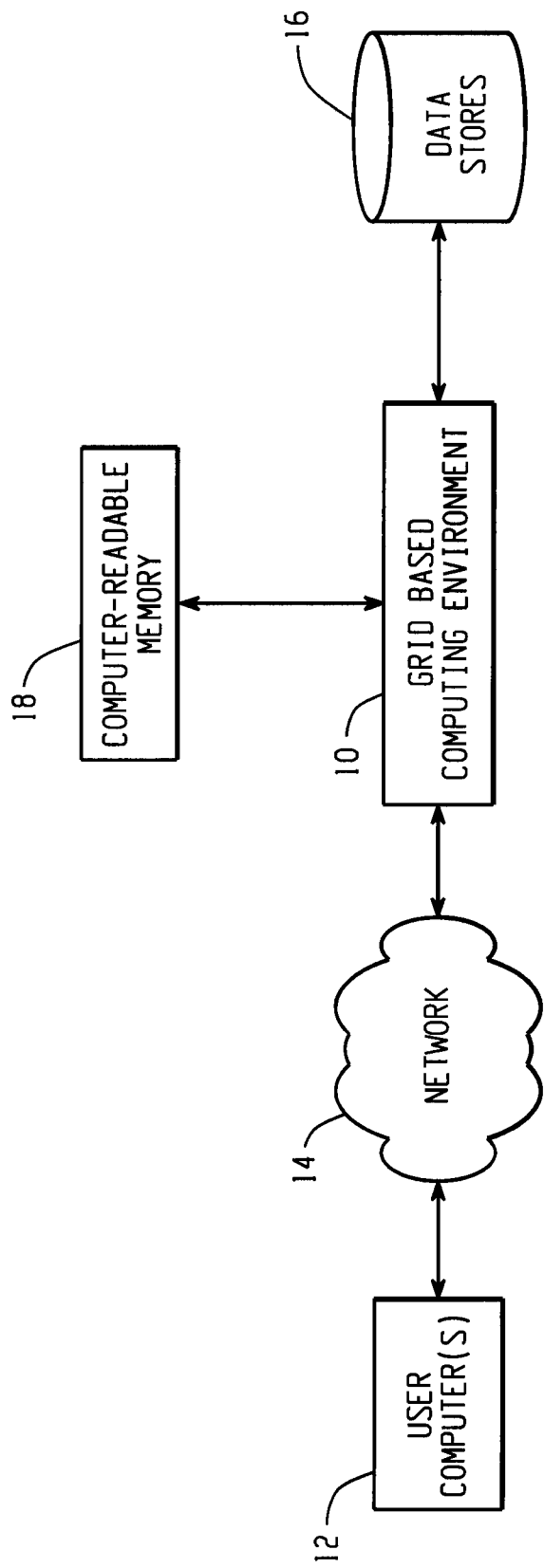
FIG. 1 is a block diagram depicting an example environment wherein users can interact with a computing environment that can perform data mining operations.

FIG. 1 depicts at 10 a computing environment for processing data for many different types of applications, such as for scientific, technical or business applications. One or more user computers 12 can interact with the computing environment 10 through a number of ways, including a network 14. The computing environment 10 illustrated is a grid-based computing environment that includes multiple compute nodes, each containing one or more servers or data processors (not shown). However, a grid-based computing environment may not be required. One or more data stores 16 may be coupled to the computing environment 10 to store data to be processed in the computing environment 10 as well as to store any intermediate or final data generated by the computing environment. Computer-readable memory 18 may also be coupled to the computing environment 10 for use by the data processors when processing data. An example application for the computing environment 10 involves the performance of data mining, in general, and initial data exploration before the start of data analysis, in particular.

Figure 2:
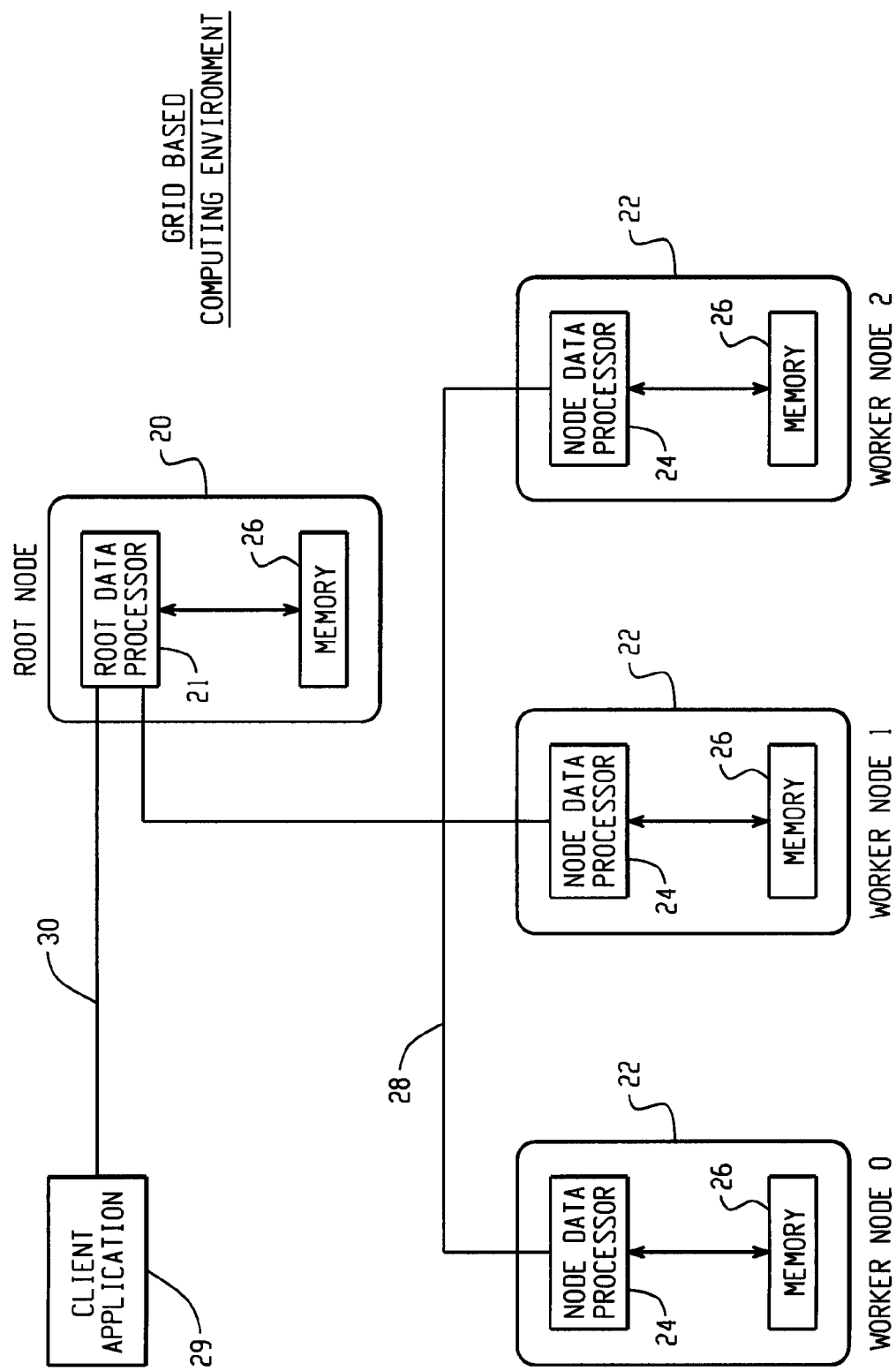
FIG. 2 is a block diagram depicting an example grid-based computing environment that can perform data mining operations.

FIG. 2 illustrates hardware components for an example grid-based computing system 10, which is the computing environment 10 in FIG. 1. The grid-based computing system 10 includes a number of data processing nodes 20, 22 comprising multi-core data processors 21, 24 in this example. One of the nodes is designated a control or root data processing node 20 and a plurality of the nodes are designated as worker data processing nodes 22. Each data processing node 20, 22 may include computer-readable memory 26 that is accessible to the data processor associated with that node.

The various data processing nodes 20, 22 are connected via a network 28 and can communicate with each other using a predetermined communication protocol such as the Message Passing Interface (MPI). The root data processor 21 at the control node 20 can communicate with a client application 29 over a communication path 30 to receive ad hoc queries from a user and to respond to those ad hoc queries after processing data.

Figure 3:
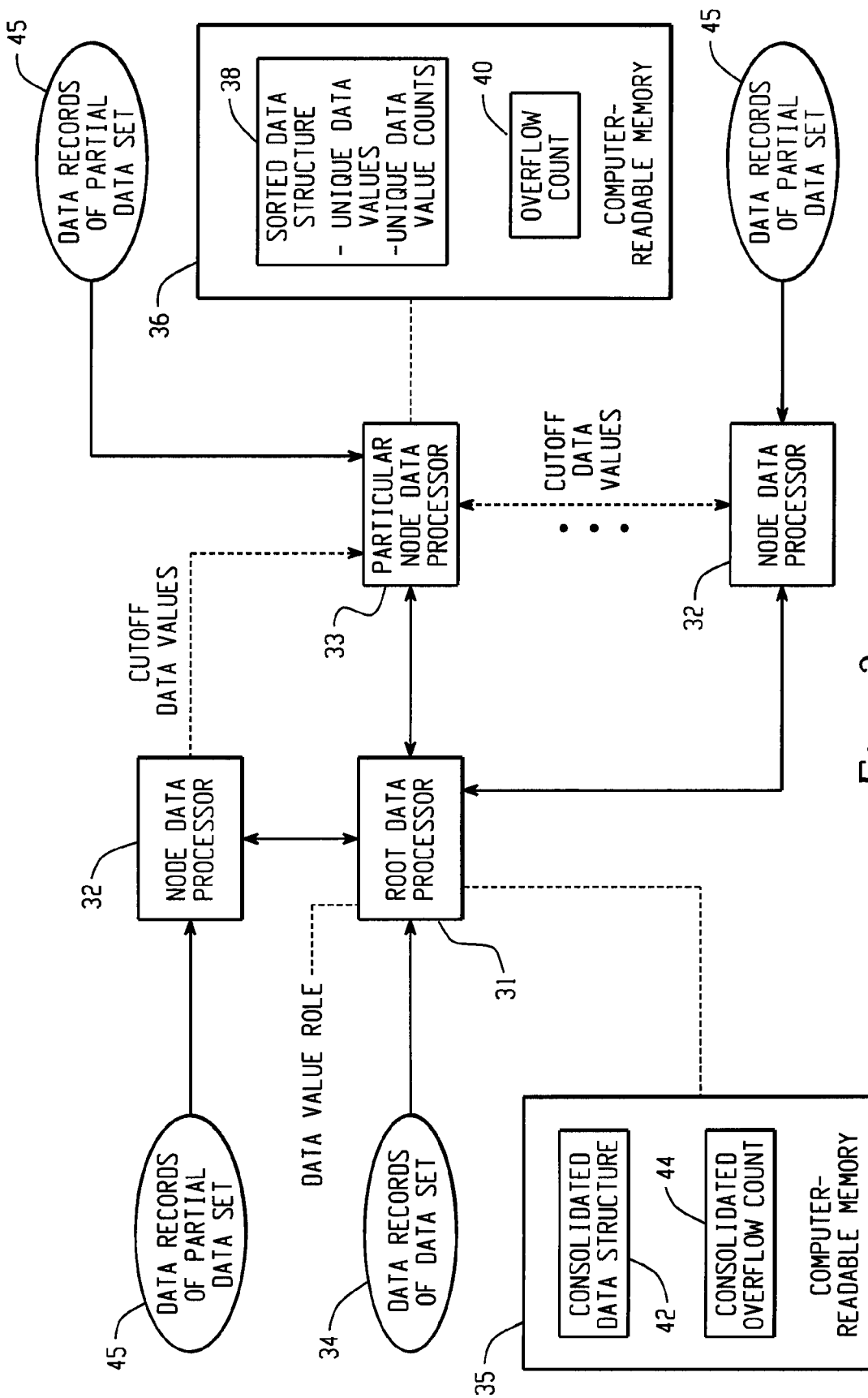
FIG. 3 is a block diagram depicting an example grid-based computing environment that can evaluate data value roles.

FIG. 3 depicts an example grid-based computing system that is configured to execute a method for fast identification of data variable roles during initial data exploration. This example system includes a root data processor 31 and a plurality of worker node data processors 32, 33, wherein one of the worker node data processors is designated as a particular worker node data processor 33 for illustrative purposes. The root data processor 31 is operative to receive data records 34 of a data set on which fast identification of data variable roles will be performed during an initial data exploration operation. The root data processor 31 can communicate bi-directionally with each of the worker node data processors 32, 33, and each of the worker node data processors 32, 33 can communicate bi-directionally with the other worker node data processors 32, 33. Alternatively (or in addition), the worker node data processors 32, 33 may have data records 45 of a portion of the data set pre-distributed to the node instead of all data records 34 of the complete data set being initially stored at the root data processor node.

Also, depicted are computer-readable memory 35 coupled to the root data processor 31 and computer-readable memory 36 coupled to the particular node data processor 33. In some implementations, the computer-readable memory 36 includes a sorted data structure 38 for capturing unique data values and unique data value counts for variables analyzed by the particular node data processor. The computer-readable memory 36 also captures an overflow count 40 for variables analyzed by the particular node data processor. The computer-readable memory 36 and its contents are illustrative of computer-readable memory (not shown) that is coupled to the other node data processors 32.

The computer-readable memory 35 coupled to the root data processor 31 includes a consolidated data structure 42 for combining and recording consolidated data values and counts received from the sorted data structures 38 from the various node data processors 32, 33. The computer-readable memory 35 also captures a consolidated overflow count 44 by combining and consolidating unique overflow counts 40 received from the various node data processors 32, 33.

Figure 4:
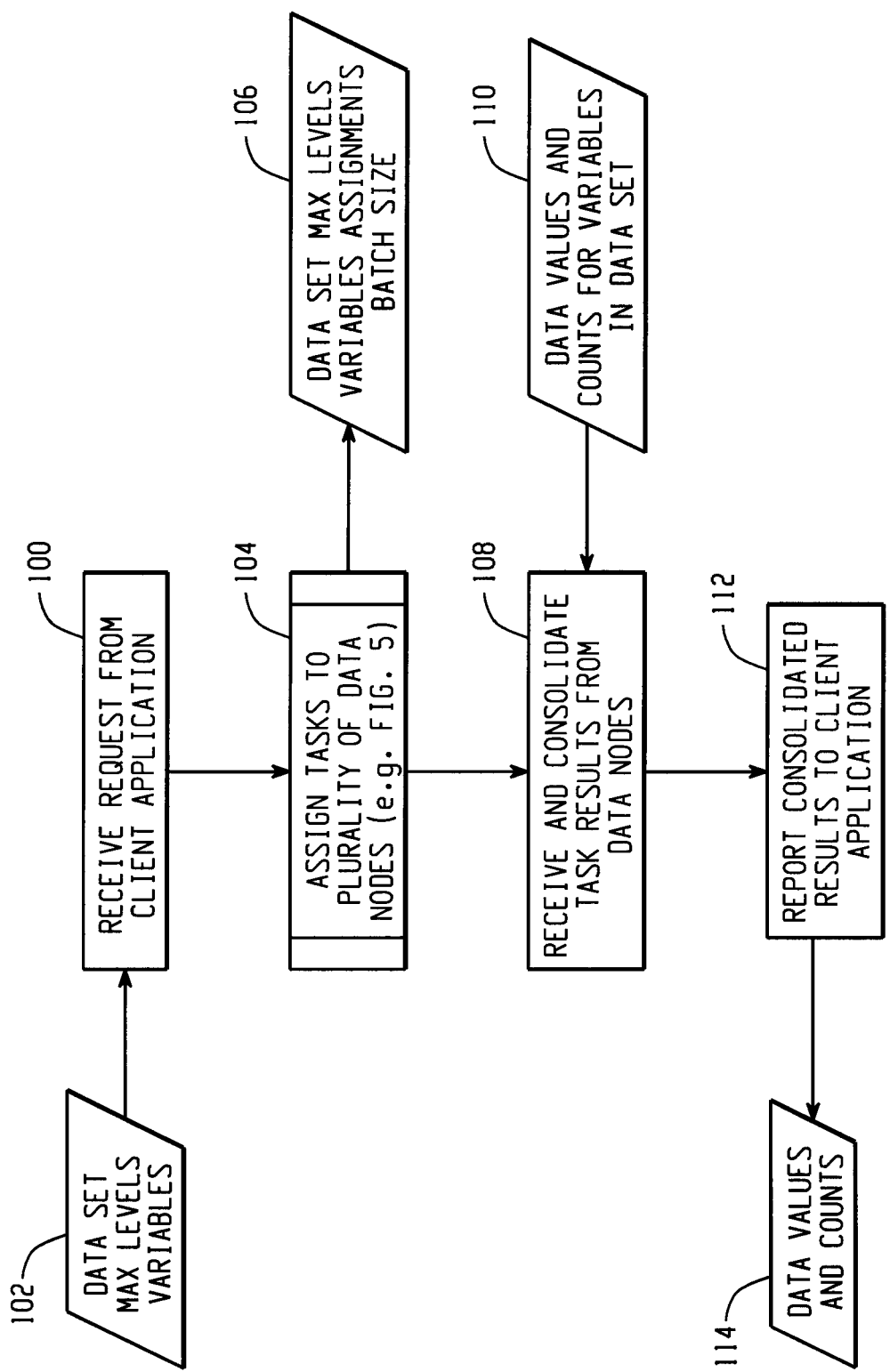
FIG. 4 is a process flow chart that depicts an example process performed by a control node data processor to identify data variable roles.

FIG. 4 depicts an example process performed by a control node data processor of one or more of the systems of FIGS. 1-3 for identifying data variable roles during initial data exploration. At operation 100, a request is received from a client application or user. The request 102 in this example includes the identity of the data set to be explored, the maximum number of levels allowed for each variable explored, and the identity of the variables to be explored.

At operation 104, the control node assigns tasks to one or more worker nodes. The task assignments in this example may be broadcast to all worker nodes. The task assignments include assigning each variable a specific worker node for consolidation of level information. The consolidation information for all variables is eventually sent to the control node. Every worker node is sent the tasking for all worker nodes. The specific assignment 106 for each worker node may include the identity of the data set, the maximum number of levels allowed for each variable explored, the identity of the variables to be explored, a specific variable assigned to a particular worker node, and the portion of the data set assigned to a particular worker node if the data has not been pre-distributed in 45 of FIG. 3.

At operation 108, the control node receives the results of the analysis performed by the worker nodes. The results 110 may include the data values and counts for variables in the data set. In this example, since certain worker nodes are assigned specific variables, the control node may receive from certain worker nodes the values and total counts for their assigned variables. The control node in this case would consolidate all task results from the various reporting worker nodes.

At operation 112, the control node may report the consolidated results to the client application or user. The consolidated results 114 may include the data values and counts for the variables specified by the client application or user in the request 102.

Figure 5:
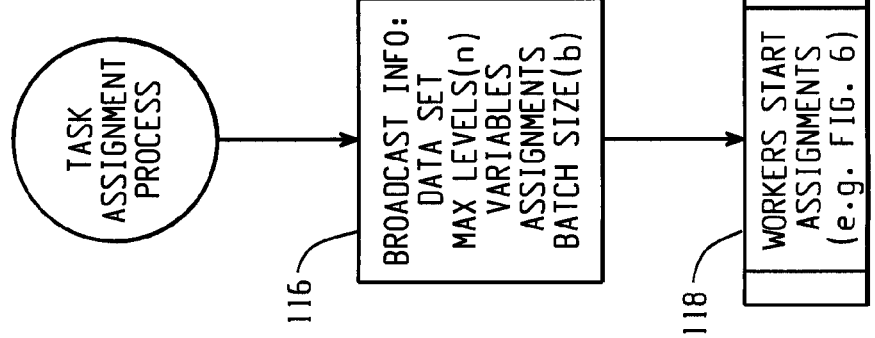
FIG. 5 is a process flow chart that depicts an example process performed by a control node data processor to assign tasks to a plurality of worker node data processors.

FIG. 5 depicts an example process performed by a control node data processor to assign tasks to a plurality of worker node data processors. At operation 116, the control node broadcasts the task assignments to all worker nodes. The assignment for each worker node may include the identity of the data set, the maximum number of levels (n) allowed for each variable explored, the identity of the variables to be explored, a specific variable assigned to a particular worker node, the portion of the data set assigned to a particular worker node, and a batch size (b) identifying the number of observations for a worker node to process before reporting its progress to other worker nodes. After the broadcast, the worker nodes may proceed with processing their portions of the data set (operation 118).

Figure 6:
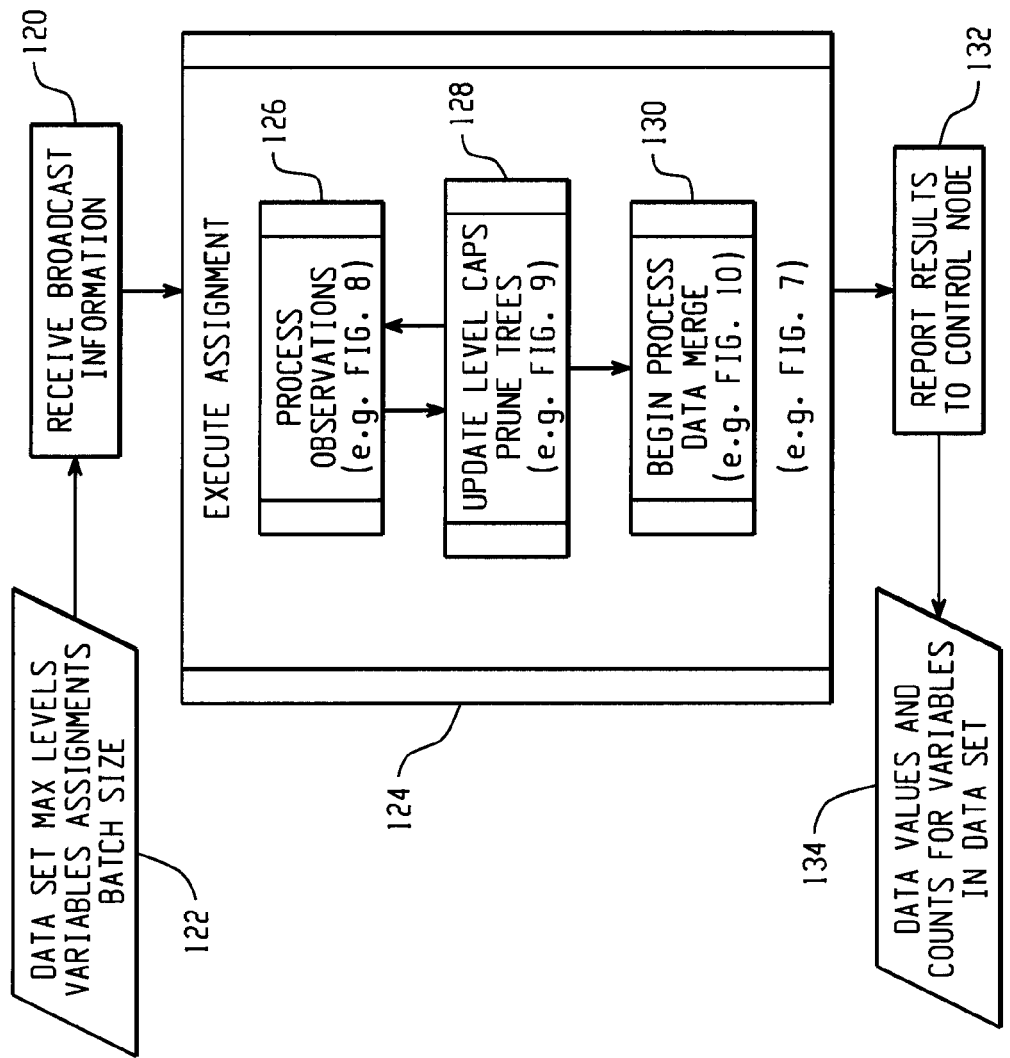
FIG. 6 is a process flow chart that depicts an example process performed by worker node data processors.

FIG. 6 depicts an example process performed by worker node data processors. At operation 120, the worker node processors receive the broadcast information. The broadcast information 122 may include the identity of the data set, the maximum number of levels (n) allowed for each variable explored, the identity of the variables to be explored, a specific variable assigned to a particular worker node, the portion of the data set assigned to a particular worker node, and a batch size (b) identifying the number of observations for a worker node to process before reporting its progress to other worker nodes.

At operation 124, each worker node processor begins executing its assignment. Assignment execution may involve retrieving its assigned portion of the data set, which contains observations to be processed, and processing a first batch of observations (operation 126). Processing observations may involve generating and updating a binary tree for each encountered variable, wherein the binary tree can have no more than the maximum number of levels (n). After a batch size (b) of observations has been processed, each worker node processor broadcasts information regarding its binary trees to allow the collective group of worker node processors to update level caps and prune their binary trees (operation 128). After tree pruning, each worker node processor processes another batch size (b) of observations (operation 126) followed by additional level cap updates and binary tree pruning (operation 128). This cycle repeats until all of the observations are processed. After all of the observations are processed, the worker node processors begin to merge their data (operation 130). After the data merge, the worker node processors report the results relating to their assigned variables to the control node processor (operation 132). The results 134 may include the data values and counts for the variables specified by the client application or user in the request that initiated the analysis.

Figure 7:
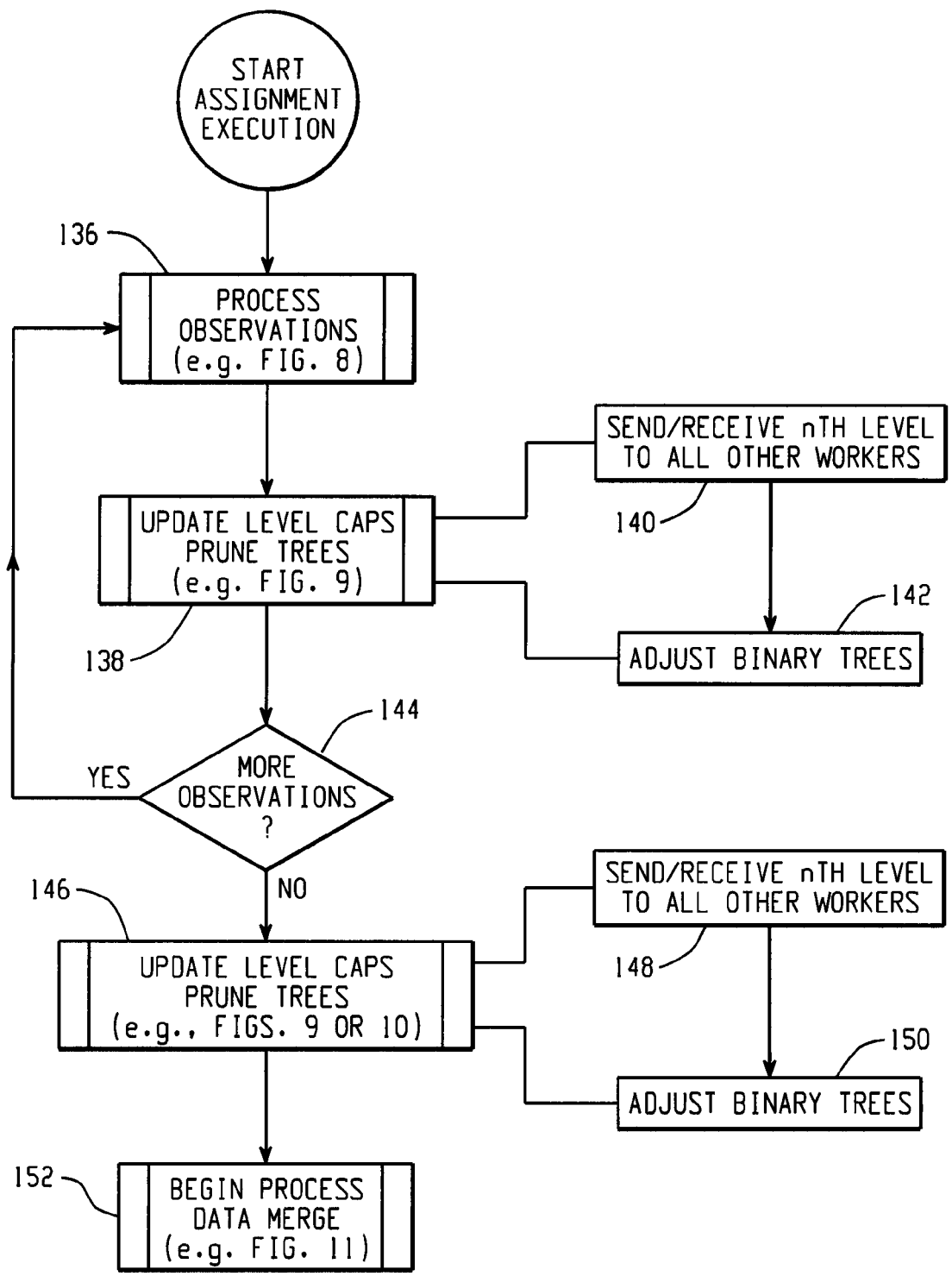
FIG. 7 is a process flow chart that depicts an example process performed by a particular worker node processor when executing its assignment.

FIG. 7 depicts an example process performed by a particular worker node processor when executing its assignment. At operation 136, a particular worker node processor processes a first batch of observations. Processing observations may involve generating and updating a binary tree for each encountered variable, wherein the binary tree can have no more than the maximum number of levels (n). After a batch size (b) of observations has been processed, the worker node processor begins the process of updating the level caps for its binary trees and pruning the binary trees (operation 138). During this operation, the worker node processor broadcasts information regarding its binary trees. In particular, the worker node processor broadcasts for each variable the value of the nth level in the variable's binary tree to the other worker node processors (operation 140). The particular worker node processor at operation 140 also listens for the nth level of corresponding binary trees prepared by the other worker node processors. After receiving the nth level of corresponding binary trees, the particular worker node processor adjusts its binary trees (operation 142) by setting its cap level to the most restrictive of the nth levels received from the other worker node processors and prunes its binary trees.

After tree pruning, the particular worker node processor determines if there are more observations to be processed (operation 144) and processes another batch size (b) of observations (operation 136) if more observations are available for processing. If no more observations are available for processing, the particular worker node processor begins the process of updating the level caps for its binary trees and pruning the binary trees (operation 146) one last time. During this operation, the worker node processor broadcasts for each of its variables the value of the nth level in the variable's binary tree to the other worker node processors (operation 148) and listens for the nth level of corresponding binary trees prepared by the other worker node processors. After receiving the nth level of corresponding binary trees, the particular worker node processor adjusts its binary trees (operation 150) by setting its cap level to the most restrictive of the nth level received from the other worker node processors and prunes its binary trees. After tree pruning, the particular worker node processor begins the data merge process (operation 152).

Figure 8:
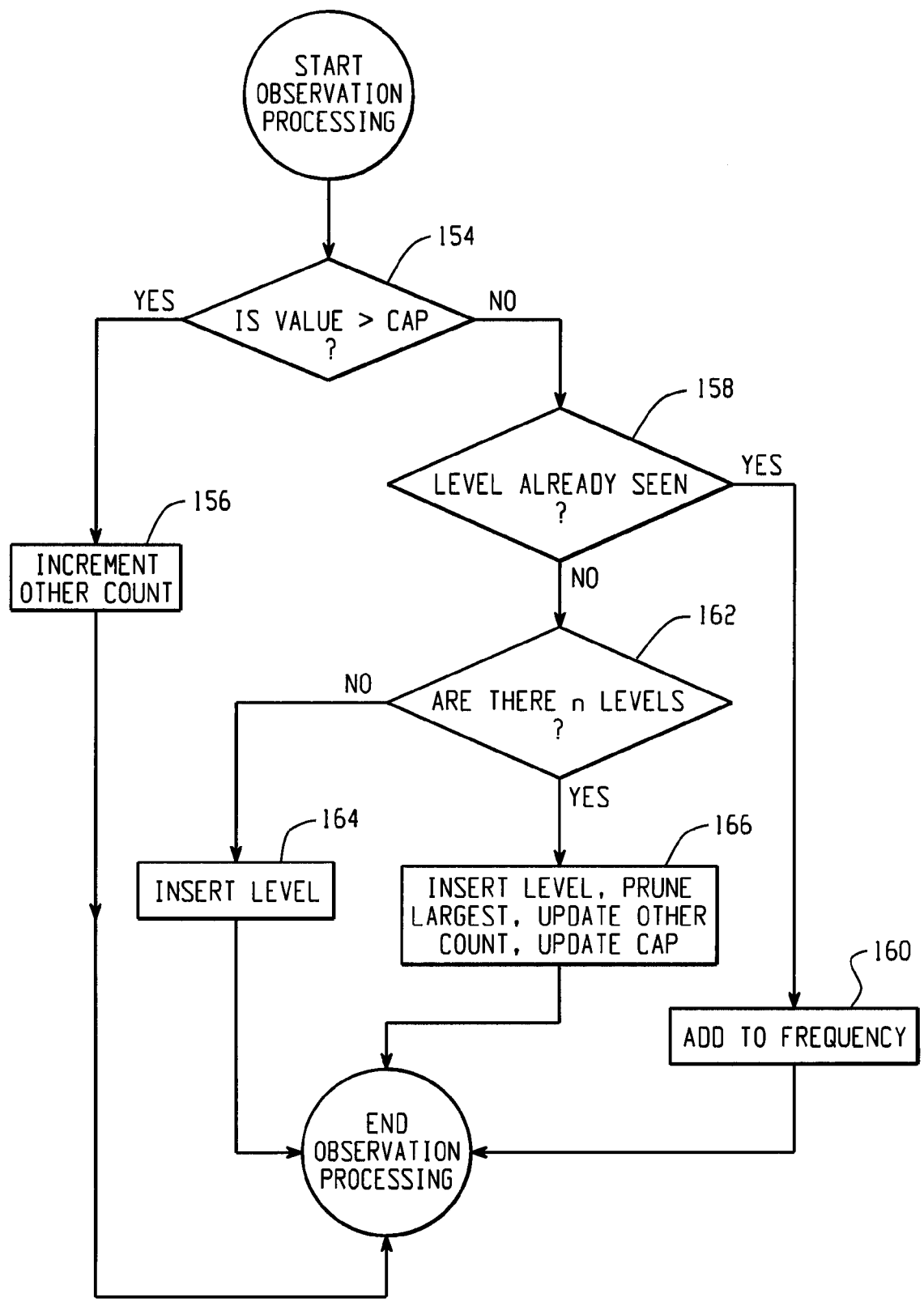
FIG. 8 is a process flow chart that depicts an example process performed by a particular worker node processor to process its assigned observations.

FIG. 8 depicts an example process performed by a particular worker node data processor to process its assigned observations. Each worker node passes through its data creating binary trees of the top n values of each variable. With each new observation, each binary tree is updated. At operation 154, the particular worker node data processor determines if the observation value for a variable is greater than a level cap in the binary tree for that variable. If the value is greater than the cap, then an "other count" counter is incremented (operation 156) and the processing of that observation is completed. If the value is not greater than the cap, then the particular worker node data processor determines if the observation value has already been seen (operation 158). If the level has already been seen, then a frequency counter for that level is incremented (operation 160) and the processing of that observation is completed. If the level has not already been seen, then the particular worker node data processor determines if the binary tree already has n levels (operation 162). If the binary tree does not have n levels, then a level equal to the value of the observation is inserted into the binary tree (operation 164), a frequency count for the level is established, and the processing of that observation is completed. If the binary tree does have n levels, then a level equal to the value of the observation is inserted into the binary tree, the largest level is pruned (or deleted) from the binary tree, the other count counter is incremented by the number in the frequency counter for the pruned level, the level cap is updated to be equal to the value of the largest level (operation 166), and a frequency count for the level is established. The processing of that observation is then completed. After an observation is processed, then the next observation is processed until the batch (b) number of observations has been processed or the last observation has been processed, whichever occurs first.

Figure 9:
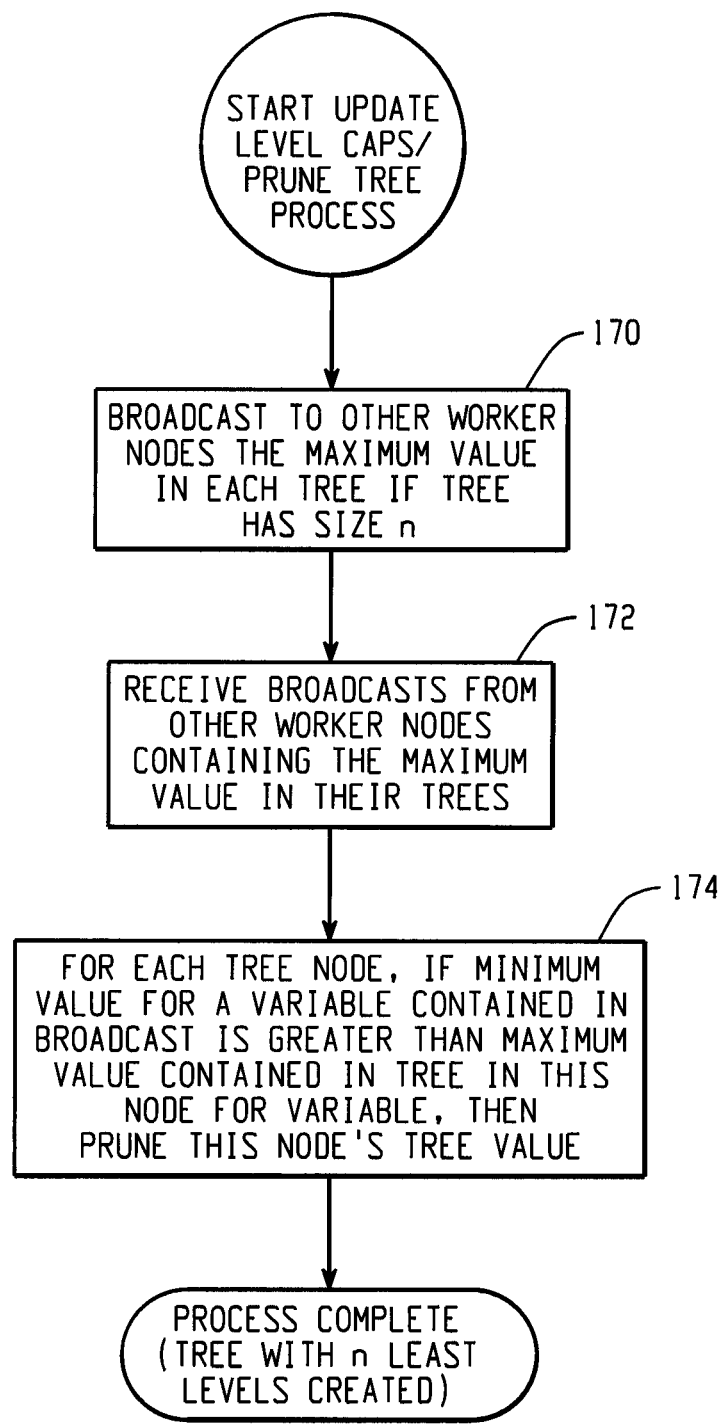
FIG. 9 is a process flow chart that depicts an example process performed by a particular worker node data processor to update level caps and prune trees to create trees with the minimum n levels.

FIG. 9 depicts an example process performed by a particular worker node data processor to update level caps and prune trees after a batch (b) number of observations has been processed or the last observation has been processed. Periodically, every worker node will broadcast to every other worker node the value cap in each of their trees if the trees are of size n. If the trees are of a size strictly less than n, then a special value indicating that no value cap is available for this particular worker node is broadcast. The most restrictive of these value caps is a bound on the value of the nth distinct value. All tree nodes violating this value bound are pruned from every tree. Local memory usage may be reduced as a result of pruning. At operation 170, the particular worker node data processor broadcast to other worker nodes the maximum value in each tree if tree has size n. At operation 172, the particular worker node data processor receives broadcasts from other worker nodes containing the maximum value in their trees. Although this example shows operation 170 occurring before operation 172, this is not required. In appropriate situations, operation 172 may occur at the same time as or prior to operation 170. At operation 174, the particular worker node data processor determines for each tree at the node if the minimum broadcasted value for the tree is less than the level cap for the tree, then prunes the largest value from the tree, inserts the minimum broadcasted value in the tree, and sets the level cap to the minimum broadcasted value.

Figure 10:
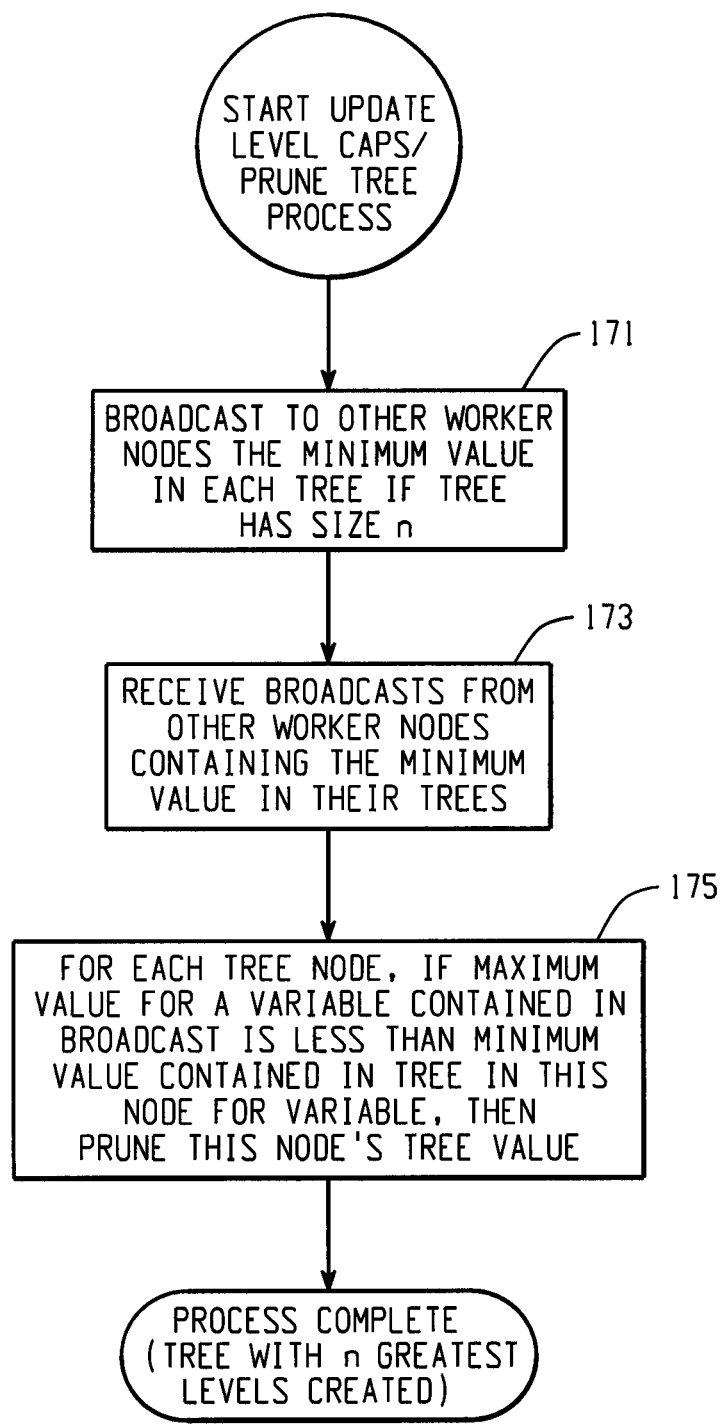
FIG. 10 is a process flow chart that depicts an example process performed by a particular worker node data processor to update level caps and prune trees to create trees with the maximum n levels.

FIG. 10 depicts an example process performed by a particular worker node data processor to update level caps and prune trees after a batch (b) number of observations has been processed or the last observation has been processed. The process depicted in FIG. 10 is similar to that of FIG. 9 except that instead of creating trees with the minimum n levels the process creates trees with the maximum n levels. Periodically, every worker node will broadcast to every other worker node the value cap in each of their trees if the trees are of size n. If the trees are of a size strictly less than n, then a special value indicating that no value cap is available for this particular worker node is broadcast. The most restrictive of these value caps is a bound on the value of the nth distinct value. All tree nodes violating this value bound are pruned from every tree. Local memory usage may be reduced as a result of pruning. At operation 171, the particular worker node data processor broadcast to other worker nodes the minimum value in each tree if tree has size n. At operation 173, the particular worker node data processor receives broadcasts from other worker nodes containing the minimum value in their trees. Although this example shows operation 171 occurring before operation 173, this is not required. In appropriate situations, operation 173 may occur at the same time as or prior to operation 171. At operation 175, the particular worker node data processor determines for each tree at the node if the maximum broadcasted value for the tree is greater than the level cap for the tree, then prunes the smallest value from the tree, inserts the maximum broadcasted value in the tree, and sets the level cap to the maximum broadcasted value.

Figure 11:
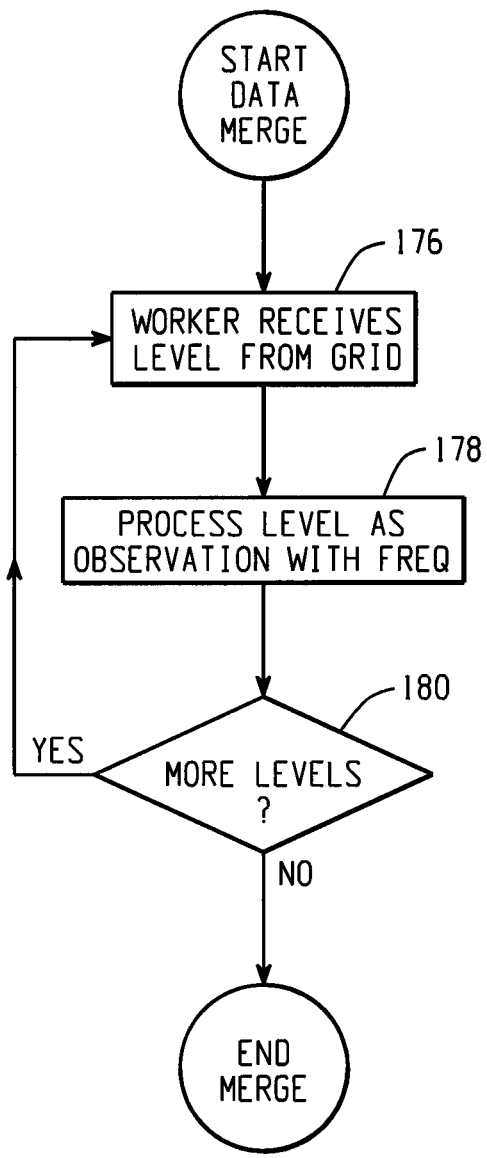
FIG. 11 is a process flow chart that depicts an example process performed by worker node data processors when merging data from other worker node data processors.

Depicted in FIG. 11 is a flow chart illustrating an example process performed by worker node data processors when merging data from other worker node data processors relating to an assigned variable. At operation 176, a particular worker node processor receives for its assigned variable a level value and a frequency count for that level from another worker node processor. At operation 178, the particular worker node processor processes that level as if it was an observation and adds the frequency count to the appropriate counter. After the level is processed, an additional level is processed if it exists (operation 180).

In particular, to process a level a particular worker node processor determines if the observation level has a value that is greater than a level cap in the binary tree for that variable. If the value is greater than the cap, then the "other count" counter is incremented by the amount of the frequency count for the level. If the value is not greater than the cap, then the particular worker node data processor determines if the level value is already in the binary tree. If the level value is already in the binary tree, then the frequency count for that level in the binary tree is incremented by the amount of the frequency count for the received level. If the level value is not already in the binary tree, then the particular worker node data processor determines if the binary tree already has n levels. If the binary tree does not have n levels, then a level equal to the value of the received level is inserted into the binary tree and a frequency count for the level is set to the frequency count for the received level. If the binary tree does have n levels, then a level equal to the value of the received level is inserted into the binary tree, the largest level is pruned (or deleted) from the binary tree, the other count counter is incremented by the number in the frequency counter for the pruned level, frequency count for the new level is set to the frequency count for the received level, and the level cap is updated to be equal to the value of the largest level, a frequency count for the level is established.

Figure 12:
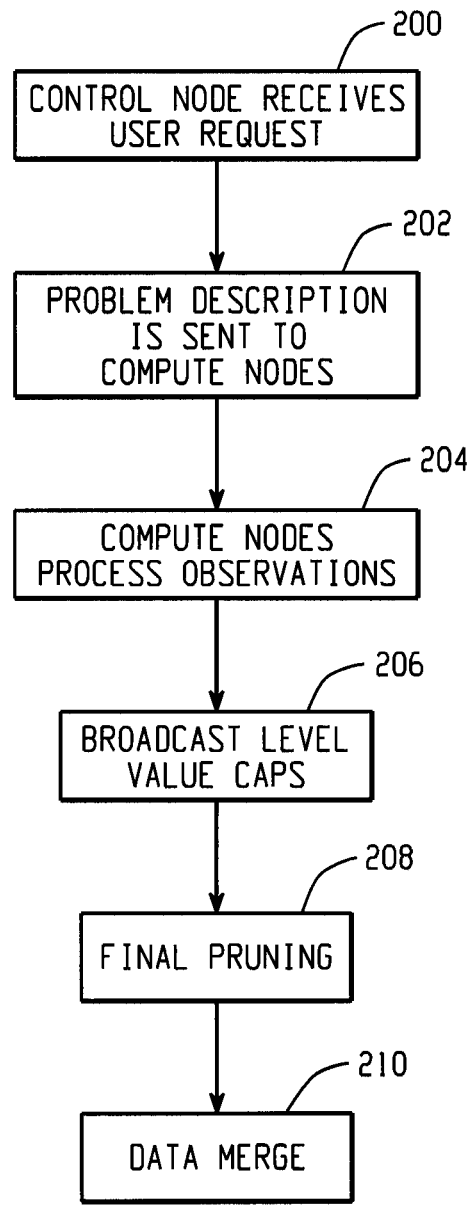
FIG. 12 is a process flow chart that depicts an example process for identifying data variable rules during initial data exploration.

FIG. 12 depicts another example method for identifying data variable roles during initial data exploration. This method is appropriate for either a grid-based computing environment or a standalone computing environment. In this example a computing system having a control node and two compute nodes are used. The control node and compute nodes may be in either a grid-based computing environment or a standalone computing environment. At operation 200 the control node receives a request from a user specifying the data set, the variables (C1 and N1 in the examples in FIGS. 13-17) and a threshold for the number of levels returned (4 in the examples in FIGS. 13-17).

At operation 202, the problem description is sent to the compute nodes. The control node sends the complete problem description to each of the two compute nodes. This includes operational information such as the number of records to process before broadcasting the $4^{th}$ largest observed level and information regarding which compute node is assigned to perform the final aggregation of levels for each variable.

Depicted in FIG. 13 are two tables that, respectively, show the observations that are assigned to compute node 1 and compute node 2. Each table contains observation values for the two variables, C1 and N1.

Referring again to FIG. 12, at operation 204, the compute nodes process observations. Each compute node processes its assigned observations and creates a local tree of the top 4 levels for each variable. Local binary trees are used to keep an ordered copy of the top 4 levels. A description of an example type of binary tree that may be used can be found at Donald Knuth. The Art of Computer Programming, Volume 3, Second Edition. Addison-Wesley, 1998. Pages 426-454, although many other binary tree implementations may be used. The compute nodes process observations in parallel and each variable is processed in a single pass.

The collection of tables at FIGS. 14a and 14b show the state of observed levels recorded in the binary trees after each observation is processed. Changes from the previous state are indicated in bold type. Each of observations 1-4 are recorded in the binary trees and are shown in the tables of FIGS. 14a and 14b. It is not until observation 5 for each compute node is processed that levels are pruned from the binary trees.

The fifth observation is the first instance where there are more than 4 observed levels of Variable N1. At Worker1, the addition of the 29.9 level causes the largest level, 65.3, to be removed from the list and its frequency added to the "Other" level. On Worker2, the 60.5 level causes the 72.1 level to be removed from the list and its frequency added to the "Other" level.

After processing the fifth observation, an intermediate pruning of the variable N1 occurs. Each compute node broadcasts its current $4^{th}$ level (Worker1 sends 51, Worker2 sends 60.5). The value 60.5 is removed from Worker2 (since 60.5>51) and its frequency is added to the "Other" level. The stored levels after this pruning operation are shown in row 5P. Notably, the list for Variable N1 on Worker2 has only 3 levels. When a new level is observed, it will only be added to the list if it is less than or equal to the value used during the last pruning phase, 51. The intermediate pruning done in this operation is optional.

During processing of the sixth observation at Worker1, another pruning of the variable N1 occurs. The value of 51 is removed and its frequency is added to "Other". N1=38.6 is the last value in its tree. During processing of the sixth observation at Worker2, the level 2.1 is added and no pruning is necessary. Shown in the final two tables of FIG. 14b, are the states of the binary trees after all six observations have been processed at both compute nodes.

No pruning was needed for the variable C1 on either compute node since the cardinality of C1 was not greater than 4. Also, during the processing of the observations, pruning of any variable can take place as soon as the cardinality of the variable processed at any node reaches the maximum level set by the user.

Referring again to FIG. 12, at operation 206, the compute nodes broadcast maximum level values. After all observations are processed, each compute node broadcasts its 4th level of each variable one last time (or a special value indicating there is no 4th level).

At operation 208, final pruning is done. Once the broadcast of largest level values occurs final pruning can begin. For Variable C1, none of the worker node has attained the preset maximum number of level so no pruning occurs for Variable C1 levels. For Variable N1, Worker1 broadcasts 38.6 and Worker2 broadcasts 35.2. Since the Worker2 maximum level is lower, the Worker 1 level list is pruned. The final level lists for both worker nodes are shown in FIG. 15.

At operation 210, data merge takes place. The values for Variable C1 are merged on Worker1. In this case C1 has the same levels on both nodes. An upper bound of 6 on the cardinality after the merge of C1 is possible depending on the levels on each node. Since the two worker nodes contain the same levels, the cardinality of C1 (3) after the 3 merges will remain the same. Only the frequency values will be updated. Arrows in FIG. 16 indicate how levels on one compute node are merged with the other compute node.

Merging of the values for N1 is illustrated in FIGS. 17A-17E. In this example, merging involves adding the nodes from the tree on Worker 1 to the nodes of the tree that exists on Worker2. In particular, FIG. 17A illustrates the merger of level 17.3 from Worker 1 with the Worker 2 table. FIG. 17B illustrates the merger of level 21.2 from Worker 1 with the Worker 2 table. FIG. 17C illustrates the merger of level 29.2 from Worker 1 with the Worker 2 table. FIG. 17D illustrates the merger of the Other data from Worker 1 with the Other data in the Worker 2 table. And, the final tables in FIG. 17E illustrate the final result after the data merge is complete. The final tables resulting from the data merge can either be written to a distributed data set or sent to the control node and then output to a client.

In the examples of FIGS. 8-9 and 13-17, the level having the largest value is pruned when tree pruning is performed. Any of these examples, however, could alternatively be modified so that the level having the smallest value is pruned instead as illustrated in FIG. 10.

The operations depicted in FIGS. 4-17 may be implemented by one or more processors executing programming instructions. The programming instructions may be stored in data stores and/or computer-readable memory.

The foregoing examples illustrate systems having separate control and worker nodes. Separate control and worker nodes, however, are not required. A control node may also function as a worker node.

Referring back to FIGS. 1 and 2, depicted are examples of systems that may be used to identify data variable roles during initial data exploration. FIG. 1, in particular, depicts an example client/server environment, and FIG. 2 depicts a system that can be used in either a standalone environment or a client/server environment.

FIGS. 1 and 2 also depict example grid-based computing systems that may be used to identify data variable roles during initial data exploration, but a grid-based computing system is not required. The control node could also function as a worker node in a system containing only a single worker node. In that case, the system may comprise a single computer.

Figure 18:
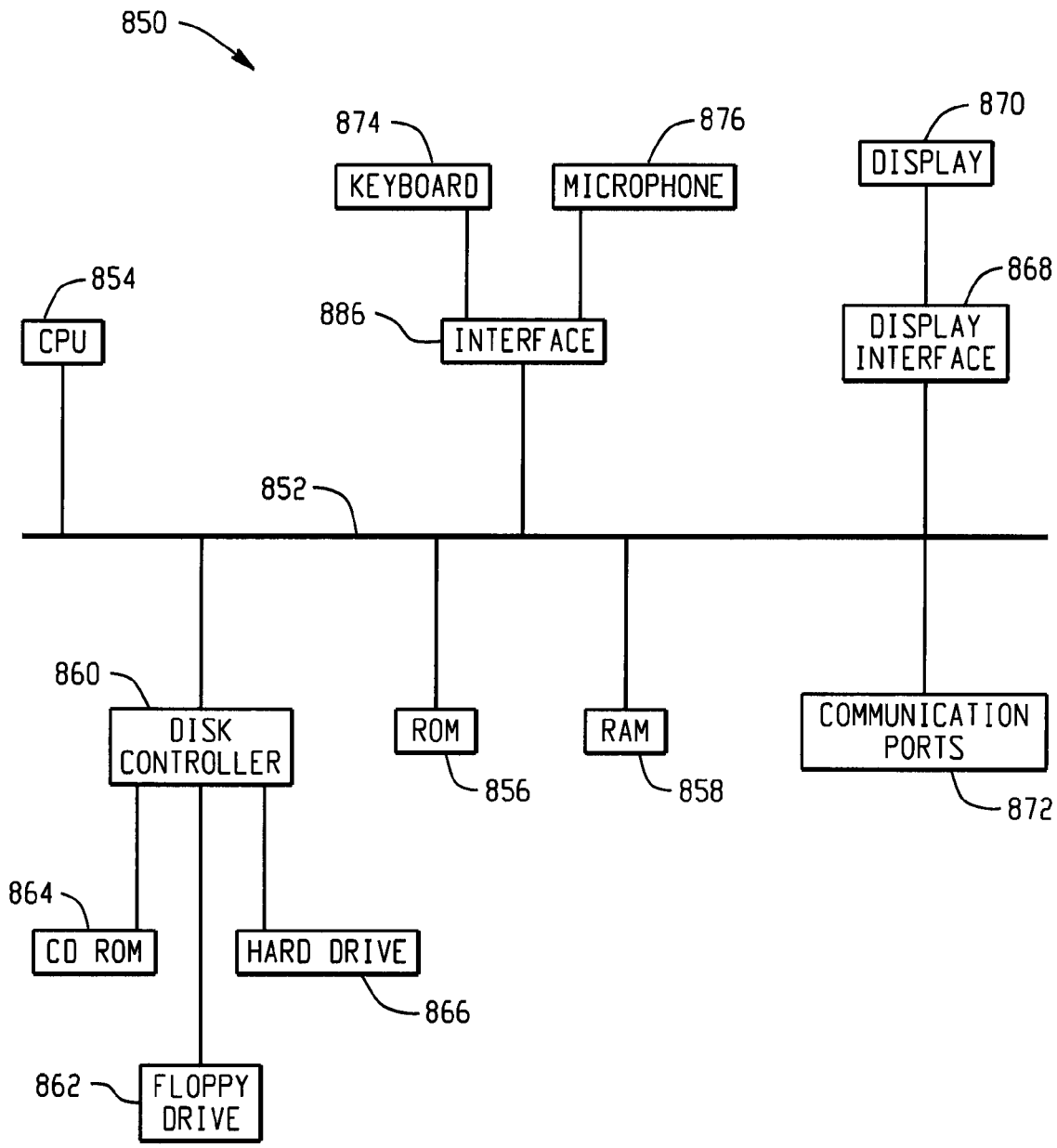
FIG. 18 is a block diagram of example hardware for either standalone or client/server computer architecture.

FIG. 18 shows a block diagram of example hardware for either standalone or client/server computer architecture 850, such as the architecture depicted in FIGS. 1 and 2 that may be used to contain and/or implement the program instructions of system embodiments of the present disclosure. A bus 852 may connect the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing an index join operation. Optionally, program instructions may be stored on a computer readable storage medium such as a magnetic disk, optical disk, recordable memory device, flash memory, or other physical storage medium. Computer instructions may also be communicated to other systems, components or devices.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processing system 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 874, or other input device 876, such as a microphone, remote control, pointer, mouse and/or joystick.

In some implementations, before performing analytics on a possibly large and distributed data set a determination can be made regarding the variables that can potentially be used as class variables or as numeric (interval) variables. Some variables may be suitable for inclusion in the analysis even if may they contain many distinct levels. In addition, getting accurate frequency counts for a subset of levels can provide additional insight into the data set.

The patentable scope of the described subject matter may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of determining a role for a data variable for use in data modeling of a physical process, comprising:
    identifying to a plurality of data nodes a set of data records containing data values assigned to each data node, a maximum number of levels to record in a sorted data structure at the data nodes, and the data node responsible for each of a plurality of variables;
    receiving for each variable from the data node responsible for the variable a plurality of unique data values for the variable, a count for each of the unique data values and an overflow count for the variable, wherein a number of unique data values does not exceed the maximum number of levels, wherein the data values, counts and overflow count have been generated at a plurality of data nodes by node data processors configured by data processing instructions to:
        determine whether a next data value for a data record is added to the sorted data structure at the data node and that a count associated with that next data value is added to the sorted data structure when the next data value is added,
        determine whether the next data value is already included in the sorted data structure and that the count associated with that next data value is incremented when the next data value is already included, and
        determine whether the next data value should not be added to the data structure and that an overflow count at that node should be incremented when the next data value cannot be added;
    wherein a role for a variable is determined based upon the unique data values, counts and overflow count for a variable.

2. The method of claim 1, wherein the data processing instructions that configure the node data processors to determine whether a next data value for a data record is added to the sorted data structure further comprise data processing instructions that configure the node data processors to:
    determine whether adding the next data value would increase the number of unique data values in the sorted data structure beyond the maximum number of levels;

remove one of the unique data values when adding the next data value would increase the number of unique data values in the sorted data structure beyond the maximum number of levels; and add the count associated with the removed data value to the overflow count.

3. The method of claim 2, wherein the removed data value is a highest data value of the unique data values.

4. The method of claim 2, wherein the removed data value is a lowest data value of the unique data values.

5. The method of claim 2, wherein the node data processors are further configured by data processing instructions to determine that the next data value is added when the next data value is lower than a highest unique data value in the sorted data structure when the sorted data structure is sorted from lowest to highest.

6. The method of claim 2, wherein the node data processors are further configured by data processing instructions to determine that the next data value is added when the next data value is higher than a lowest unique data value in the sorted data structure when the sorted data structure is sorted from highest to lowest.

7. The method of claim 1, wherein the node data processors are further configured by data processing instructions to:
broadcast a most-restrictive, unique data value for a variable from the sorted data structure as a cutoff data value to other node data processors;
receive a cutoff data value for the variable from other node data processors; and
purge any unique data values from the sorted data structure that are beyond the most-restrictive, received cutoff data value.

8. The method of claim 7, wherein the node data processors are further configured by data processing instructions to add to the overflow count for a variable the counts associated with purged unique data values.

9. The method of claim 7, wherein the most-restrictive, unique data value is a highest unique data value and wherein the purged unique data values are higher than the received cutoff data value.

10. The method of claim 7, wherein the most-restrictive, unique data value is a lowest unique data value and wherein the purged unique data values are lower than the received cutoff data value.

11. The method of claim 1, wherein the data processing instructions that configure the node data processors to determine whether a next data value for a data record is added to the sorted data structure further comprise data processing instructions that configure the node data processors to:
determine that the next data value is added when adding the next data value would not increase the number of unique data values in the sorted data structure beyond the maximum number of levels.

12. The method of claim 1, wherein the data processing instructions that configure the node data processors to determine whether a next data value for a data record is added to the sorted data structure further comprise data processing instructions that configure the node data processors to:
determine that the next data value cannot be added when the next data value is beyond the bound of any cutoff value received at the particular node data processor.

13. The method of claim 1, wherein the data processing instructions further comprise data processing instructions that configures at least one node data processor to:
sum the counts for data values in the sorted data structure for a variable with counts in the sorted data structure from other data nodes for the variable;

purge data values that would increase a number of unique consolidated data values for the variable beyond the maximum number of levels; and add the counts for purged data values to the overflow count.

14. The method of claim 1, wherein the variable role is determined to be a class variable candidate when the number of unique data values in the sorted data structure is less than or equal to a predetermined number.

15. The method of claim 1, wherein the variable role is determined to be an index variable candidate when the count of each level is equal to one.

16. The method of claim 1, wherein the variable role is determined to be an interval variable candidate when the counts of each level are much smaller than the overflow count.

17. The method of claim 1, wherein the sorted data structure is a binary tree.

18. The method of claim 1, wherein the sorted data structure is a sorted array.

19. The method of claim 1, wherein identifying to a plurality of data nodes a set of data records comprises distributing to the plurality of data nodes the set of data records by a root data processor.

20. The method of claim 19, wherein identifying to a plurality of data nodes a set of data records is performed by a root data processor and wherein the root data processor assigns for each variable one node data processor to consolidate data values, data value counts and the overflow count for the variable and wherein a node data processor is assigned one or more variables to consolidate.

21. The method of claim 20, wherein consolidated results of the data values, data value counts and the overflow count are reported to the root data processor.

22. A computer-implemented system for determining a role for a data variable for use in data modeling of a physical process, comprising:
a plurality of data nodes each comprising a node data processor configured to perform operations on a plurality of data records, each data record including a data value for a variable, the plurality of data nodes including non-transitory computer-readable media encoded with a sorted data structure and encoded with data processing instructions, the sorted data structure for storing up to a predetermined number of unique data values for one or more variables, a count for each of the unique data values, and an overflow count for each of the one or more variables,
the data processing instructions comprising instructions for configuring the data node to:
determine whether a next data value is added to the sorted data structure at the data node and that a count associated with that next data value is added to the sorted data structure when the next data value is added,
determine whether the next data value is already included in the sorted data structure and that the count associated with that next data value is incremented when the next data value is already included, and
determine whether the next data value should not be added to the data structure and that an overflow count at that node should be incremented when the next data value cannot be added;
wherein one of the data nodes is a root data node comprising a root data processor configured by instructions to:
communicate data record assignments to the data nodes and a maximum number of levels to record in the sorted data structure, and receive for a plurality of variables a plurality of unique data values, a count for each of the unique data values and an overflow count for the variables;

wherein a role for a variable is determined based upon the unique data values, counts and overflow count for a variable.

23. The system of claim 22, wherein the data processing instructions further comprise instructions for configuring the data node to:
determine whether adding the next data value would increase the number of unique data values in the sorted data structure beyond the maximum number of levels;
remove one of the unique data values when adding the next data value would increase the number of unique data values in the sorted data structure beyond the maximum number of levels; and
add the count associated with the removed data value to the overflow count.

24. The system of claim 23, wherein the instructions for configuring the data node to remove one of the unique data values further configure the data node to remove a highest data value of the unique data values.

25. The system of claim 23, wherein the instructions for configuring the data node to remove one of the unique data values further configure the data node to remove a lowest data value of the unique data values.

26. The system of claim 22, wherein the instructions further configure the data node to:
broadcast a most-restrictive, unique data value for a variable from the sorted data structure as a cutoff data value to other node data processors;
receive a cutoff data value for the variable from other node data processors; and
purge any unique data values from the sorted data structure that are beyond the most-restrictive, received cutoff data value.

27. The system of claim 26, wherein the instructions further configure the data node to add to the overflow count for a variable the counts associated with purged unique data values.

28. The system of claim 26, wherein the most-restrictive, unique data value is a highest unique data value and wherein the unique data values to be purged are higher than the received cutoff data value.

29. The system of claim 26, wherein the most-restrictive, unique data value is a lowest unique data value and wherein the unique data values to be purged are lower than the received cutoff data value.

30. The system of claim 22, wherein the instructions for configuring the data node to determine whether a next data value for a data record is added to the sorted data structure further configure the data node data to:
determine that the next data value is added if adding the next data value would increase the number of unique data values in the sorted data structure beyond the maximum number of levels either when the next data value is lower than a highest unique data value in the sorted data structure when the sorted data structure is sorted from lowest to highest or when the next data value is higher than a lowest unique data value in the sorted data structure when the sorted data structure is sorted from highest to lowest.

31. The system of claim 22, wherein the instructions for configuring the data node to determine whether a next data value for a data record is added to the sorted data structure further configure the data node data to:
determine that the next data value is added when adding the next data value would not increase the number of unique data values in the sorted data structure beyond the maximum number of levels.

32. The system of claim 22, wherein the instructions for configuring the data node to determine whether a next data value for a data record is added to the sorted data structure further configure the data node data to:
determine that the next data value cannot be added when the next data value is beyond the bound of any cutoff value received at the data node.

33. The system of claim 22, wherein the instructions to configure the date nodes comprise instructions to configure a node designated by the root data node to:
sum the counts for data values in the sorted data structure for a variable with counts in the sorted data structure from other data nodes for the variable;
purge data values that would increase a number of unique consolidated data values for the variable beyond the maximum number of levels; and
add the counts for purged data values to the overflow count.

34. The system of claim 22, wherein the variable role is determined to be a class variable candidate when the number of unique data values in the stored data structure is less than or equal to the predetermined number.

35. The system of claim 22, wherein the variable role is determined to be an index variable candidate when the count setoff each level is equal to one.

36. The system of claim 22, wherein the variable role is determined to be an interval variable candidate when the counts of each level are much smaller than the overflow count.

37. The system of claim 22, wherein the sorted data structure is a binary tree.

38. The system of claim 22, wherein the sorted data structure is a sorted array.

39. The system of claim 22, wherein the data records are distributed to the data nodes by the root data processor.

40. The system of claim 22, wherein the root data processor is configured to assign for each variable one node data processor to consolidate data values, data value counts and the overflow count for the variable.

41. The system of claim 40, wherein a data node to which a variable is assigned is configured to report consolidated results to the root data processor.

42. The system of claim 40, wherein a data node is assigned one or more variables for which to consolidate results.

43. A computer-program product for performing data mining operations on data, the computer-program product tangibly embodied in a machine-readable non-transitory storage medium and including instructions configured to cause a data processing apparatus to:
identify to a plurality of node data processors a set of data records containing data values, wherein a particular node data processor is assigned a particular set of data records;
at the particular node data processor:
determine whether a data value for a next data record in the particular set of data records is added to a sorted data structure at the particular node data processor, wherein the particular node data processor is configured for each variable to store up to a predetermined number of unique data values in the sorted data structure and a count for each of the unique data values, and wherein the particular node data processor is configured to store a overflow count of data values that cannot be added to the sorted data structure;

determine that when the data value is added and the data value matches a data value in the sorted data structure, the count associated with that data value is incremented;

determine that when the data value is added and the data value does not match a data value in the sorted data structure, the data value to the sorted data structure is added;

determine that when the data value cannot be added, the overflow count is incremented; and consolidate the data values and counts for each variable from the particular node data processor with data values and counts from other of the plurality of node data processors into a sorted consolidated data structure and a consolidated overflow count, wherein a role for the variable is determined based upon the unique data values, counts and overflow count for the variable.

44. The computer-program product of claim 43, wherein the instructions are configured to cause a data processing apparatus at the particular node data processor to:

determine whether adding the next data value would increase the number of unique data values in the sorted data structure beyond a maximum number of levels;

remove one of the unique data values when adding the next data value would increase the number of unique data values in the sorted data structure beyond the maximum number of levels; and add the count associated with the removed data value to the overflow count.

45. The computer-program product of claim 44, wherein the removed data value is a highest data value of the unique data values.

46. The computer-program product of claim 44, wherein the removed data value is a lowest data value of the unique data values.

47. The computer-program product of claim 44, wherein the instructions are configured to cause a data processing apparatus at the particular node data processor to determine that the next data value is added when the next data value is lower than a highest unique data value in the sorted data structure when the sorted data structure is sorted from lowest to highest.

48. The computer-program product of claim 44, wherein the instructions are configured to cause a data processing apparatus at the particular node data processor to determine that the next data value is added when the next data value is higher than a lowest unique data value in the sorted data structure when the sorted data structure is sorted from highest to lowest.

49. The computer-program product of claim 43, wherein the instructions are configured to cause a data processing apparatus at the particular node data processor to:

broadcast a most-restrictive, unique data value for a variable from the sorted data structure as a cutoff data value to other node data processors;

receive a cutoff data value for the variable from other node data processors; and purge any unique data values from the sorted data structure that are beyond the most-restrictive, received cutoff data value.

50. The computer-program product of claim 49, wherein the instructions are configured to cause a data processing apparatus at the particular node data processor to add to the overflow count for a variable the counts associated with purged unique data values.

51. The computer-program product of claim 49, wherein the most-restrictive, unique data value is a highest unique data value and wherein the purged unique data values are higher than the received cutoff data value.

52. The computer-program product of claim 49, wherein the most-restrictive, unique data value is a lowest unique data value and wherein the purged unique data values are lower than the received cutoff data value.

53. The computer-program product of claim 43, wherein the instructions that cause a data processing apparatus at the particular node data processor to determine whether a next data value for a data record is added to the sorted data structure further comprise instructions that cause a data processing apparatus at the particular node data processor to:

determine that the next data value is added when adding the next data value would not increase the number of unique data values in the sorted data structure beyond a maximum number of levels.

54. The computer-program product of claim 43, wherein the instructions that cause a data processing apparatus at the particular node data processor to determine whether a next data value for a data record is added to the sorted data structure further comprise instructions that cause a data processing apparatus at the particular node data processor to:

determine that the next data value cannot be added when the next data value is beyond the bound of any cutoff value received at the particular node data processor.

55. The computer-program product of claim 43, wherein the instructions are configured to cause a data processing apparatus at the particular node data processor to:

sum the counts for data values in the sorted data structure for a variable with counts in the sorted data structure from other data nodes for the variable;

purge data values that would increase a number of unique consolidated data values for the variable beyond a maximum number of levels; and add the counts for purged data values to the overflow count.

56. A computer-implemented method of determining a role for a data variable for use in data modeling of a physical process, comprising:

receiving an identity of a set of data records containing data values and a maximum number of levels to record in a sorted data structure;

determining for a data variable whether a next data value for a data record is added to the sorted data structure and that a count associated with that next data value is added to the sorted data structure when the next data value is added;

determining for the data variable whether the next data value is already included in the sorted data structure and that the count associated with that next data value is incremented when the next data value is already included;

determining for the data variable whether the next data value should not be added to the data structure and that an overflow count should be incremented when the next data value cannot be added; and broadcasting for the data variable a plurality of unique data values, a count for each of the unique data values and an overflow count, wherein the number of unique data values does not exceed the maximum number of levels;

wherein a role for the data variable is determined based upon the unique data values, counts and overflow count.

57. The method of claim 56, further comprising:

determining whether adding the next data value would increase the number of unique data values in the sorted data structure beyond the maximum number of levels;

removing one of the unique data values when adding the next data value would increase the number of unique data values in the sorted data structure beyond the maximum number of levels; and adding the count associated with the removed data value to the overflow count.

58. The method of claim 57, wherein the removed data value is a highest data value of the unique data values.

59. The method of claim 57, wherein the removed data value is a lowest data value of the unique data values.

60. The method of claim 57, further comprising determining that the next data value is added when the next data value is lower than a highest unique data value in the sorted data structure when the sorted data structure is sorted from lowest to highest.

61. The method of claim 57, further comprising determining that the next data value is added when the next data value is higher than a lowest unique data value in the sorted data structure when the sorted data structure is sorted from highest to lowest.

62. The method of claim 56, further comprising:

broadcasting a most-restrictive, unique data value for a variable from the sorted data structure as a cutoff data value to other node data processors;

receiving a cutoff data value for the variable from other node data processors; and purging any unique data values from the sorted data structure that are beyond the most-restrictive, received cutoff data value.

63. The method of claim 62, further comprising adding to the overflow count for a variable the counts associated with purged unique data values.

64. The method of claim 62, wherein the most-restrictive, unique data value is a highest unique data value and wherein the purged unique data values are higher than the received cutoff data value.

65. The method of claim 62, wherein the most-restrictive, unique data value is a lowest unique data value and wherein the purged unique data values are lower than the received cutoff data value.

66. The method of claim 62, further comprising:

determining that the next data value is added when adding the next data value would not increase the number of unique data values in the sorted data structure beyond the maximum number of levels.

67. The method of claim 62, further comprising:

determining that the next data value cannot be added when the next data value is beyond the bound of any cutoff value received at the particular node data processor.

68. The method of claim 62, further comprising:

summing the counts for data values in the sorted data structure for a variable with counts in the sorted data structure from other data nodes for the variable;

purging data values that would increase a number of unique consolidated data values for the variable beyond the maximum number of levels; and adding the counts for purged data values to the overflow count.

69. A grid computing system comprising:

a plurality of data nodes each comprising a node data processor configured to perform operations on a set of data records, the plurality of data nodes including non-transitory computer-readable media encoded with a sorted data structure and encoded with data processing instructions, the data processing instructions comprising instructions for configuring the data node to:

receive an identity of the set of data records containing data values and a maximum number of levels to record in the sorted data structure;

determine for a data variable whether a next data value for a data record is added to the sorted data structure and that a count associated with that next data value is added to the sorted data structure when the next data value is added, determine for the data variable whether the next data value is already included in the sorted data structure and that the count associated with that next data value is incremented when the next data value is already included, and determine for the data variable whether the next data value should not be added to the sorted data structure and that an overflow count should be incremented when the next data value cannot be added; and broadcast for the data variable a plurality of unique data values, a count for each of the unique data values and an overflow count, wherein a number of unique data values does not exceed the maximum number of levels;

wherein a role for the data variable is determined based upon the unique data values, counts and overflow count.

70. The system of claim 69, wherein the data processing instructions further comprise instructions for configuring the data node to:

determine whether adding the next data value would increase the number of unique data values in the sorted data structure beyond the maximum number of levels;

remove one of the unique data values when adding the next data value would increase the number of unique data values in the sorted data structure beyond the maximum number of levels; and add the count associated with the removed data value to the overflow count.

71. The system of claim 70, wherein the removed data value is a highest data value of the unique data values.

72. The system of claim 70, wherein the removed data value is a lowest data value of the unique data values.

73. The system of claim 70, wherein the data processing instructions further comprise instructions for configuring the data node to determine that the next data value is added when the next data value is lower than a highest unique data value in the sorted data structure when the sorted data structure is sorted from lowest to highest.

74. The system of claim 70, wherein the data processing instructions further comprise instructions for configuring the data node to determine that the next data value is added when the next data value is higher than a lowest unique data value in the sorted data structure when the sorted data structure is sorted from highest to lowest.

75. The system of claim 69, wherein the data processing instructions further comprise instructions for configuring the data node to:

broadcast the most-restrictive, unique data value for a variable from the sorted data structure as a cutoff data value to other node data processors;

receive a cutoff data value for the variable from other node data processors; and purge any unique data values from the sorted data structure that are beyond the most-restrictive, received cutoff data value.

76. The system of claim 75, wherein the data processing instructions further comprise instructions for configuring the data node to add to the overflow count for a variable the counts associated with purged unique data values.

77. The system of claim 75, wherein the most-restrictive, unique data value is a highest unique data value and wherein the purged unique data values are higher than the received cutoff data value.

78. The system of claim 75, wherein the most-restrictive, unique data value is a lowest unique data value and wherein the purged unique data values are lower than the received cutoff data value.

79. The system of claim 75, wherein the data processing instructions further comprise instructions for configuring the data node to:
  determine that the next data value is added when adding the next data value would not increase the number of unique data values in the sorted data structure beyond the maximum number of levels.

80. The system of claim 75, wherein the data processing instructions further comprise instructions for configuring the data node to:
  determine that the next data value cannot be added when the next data value is beyond the bound of any cutoff value received at the particular node data processor.

81. The system of claim 75, wherein the data processing instructions further comprise instructions for configuring the data node to:
  sum the counts for data values in the sorted data structure for a variable with counts in the sorted data structure from other data nodes for the variable;
  purge data values that would increase a number of unique consolidated data values for the variable beyond the maximum number of levels; and
  add the counts for purged data values to the overflow count.

82. A computer-program product tangibly embodied in a machine-readable non-transitory storage medium and including instructions configured to cause a data processing apparatus to:
  receive an identity of a set of data records containing data values and a maximum number of levels to record in a sorted data structure;
  determine for a data variable whether a next data value for a data record is added to the sorted data structure and that a count associated with that next data value is added to the sorted data structure when the next data value is added,
  determine for the data variable whether the next data value is already included in the sorted data structure and that the count associated with that next data value is incremented when the next data value is already included, and
  determine for the data variable whether the next data value should not be added to the sorted data structure and that an overflow count should be incremented when the next data value cannot be added; and
  broadcast for the data variable a plurality of unique data values, a count for each of the unique data values and an overflow count, wherein a number of unique data values does not exceed the maximum number of levels;
  wherein a role for the data variable is determined based upon the unique data values, counts and overflow count.

83. The computer-program product of claim 82, wherein the instructions are configured to further cause the data processing apparatus to:
  determine whether adding the next data value would increase the number of unique data values in the sorted data structure beyond the maximum number of levels;
  remove one of the unique data values when adding the next data value would increase the number of unique data values in the sorted data structure beyond the maximum number of levels; and
  add the count associated with the removed data value to the overflow count.

84. The computer-program product of claim 83, wherein the removed data value is a highest data value of the unique data values.

85. The computer-program product of claim 83, wherein the removed data value is a lowest data value of the unique data values.

86. The computer-program product of claim 82, wherein the instructions are configured to further cause the data processing apparatus to determine that the next data value is added when the next data value is lower than a highest unique data value in the sorted data structure when the sorted data structure is sorted from lowest to highest.

87. The computer-program product of claim 83, wherein the instructions are configured to further cause the data processing apparatus to determine that the next data value is added when the next data value is higher than a lowest unique data value in the sorted data structure when the sorted data structure is sorted from highest to lowest.

88. The computer-program product of claim 82, wherein the instructions are configured to further cause the data processing apparatus to:
  broadcast a most-restrictive, unique data value for a variable from the sorted data structure as a cutoff data value to other node data processors;
  receive a cutoff data value for the variable from other node data processors; and
  purge any unique data values from the sorted data structure that are beyond the most-restrictive, received cutoff data value.

89. The computer-program product of claim 88, wherein the instructions are configured to further cause the data processing apparatus to add to the overflow count for a variable the counts associated with purged unique data values.

90. The computer-program product of claim 88, wherein the most-restrictive, unique data value is a highest unique data value and wherein the purged unique data values are higher than the received cutoff data value.

91. The computer-program product of claim 88, wherein the most-restrictive, unique data value is a lowest unique data value and wherein the purged unique data values are lower than the received cutoff data value.

92. The computer-program product of claim 88, wherein the instructions are configured to further cause the data processing apparatus to:
  determine that the next data value is added when adding the next data value would not increase the number of unique data values in the sorted data structure beyond the maximum number of levels.

93. The computer-program product of claim 88, wherein the instructions are configured to further cause the data processing apparatus to:
  determine that the next data value cannot be added when the next data value is beyond the bound of any cutoff value received at the particular node data processor.

94. The computer-program product of claim 88, wherein the instructions are configured to further cause the data processing apparatus to:
  sum the counts for data values in the sorted data structure for a variable with counts in the sorted data structure from other data nodes for the variable;
  purge data values that would increase a number of unique consolidated data values for the variable beyond the maximum number of levels; and
  add the counts for purged data values to the overflow count.

* * * * *

UNITED STATES PATENT AND TRADEMARK OFFICE
CERTIFICATE OF CORRECTION

PATENT NO. : 8,918,410 B2  Page 1 of 1
APPLICATION NO. : 13/772404
DATED : December 23, 2014
INVENTOR(S) : Georges H. Guirguis et al.

It is certified that error appears in the above-identified patent and that said Letters Patent is hereby corrected as shown below:

IN THE CLAIMS

Col. 13, Line 64 (claim 13)

Delete "that configures" and replace with --that configure--

Signed and Sealed this
Twenty-seventh Day of October, 2015

Michelle K. Lee
*Director of the United States Patent and Trademark Office*